Patented Mar. 4, 1930

1,749,677

UNITED STATES PATENT OFFICE

HUGO SCHWEITZER, OF WIESDORF, NEAR COLOGNE, AND WILHELM NEELMEIER, OF LEVERKUSEN, NEAR COLOGNE, GERMANY, ASSIGNORS TO GENERAL ANILINE WORKS, INC., OF NEW YORK, N. Y., A CORPORATION OF DELAWARE

AMINODIARYLSULFONPYRAZOLONE AZO DYESTUFFS

No Drawing. Original application filed January 5, 1926, Serial No. 79,476, and in Germany January 8, 1925. Divided and this application filed March 30, 1927. Serial No. 179,708.

This invention relates to new azodyestuffs prepared from the pyrazolones of aminodiarylsulfones and their derivatives, such as sulfonic acids, carboxylic acids, hydroxycarboxylic acids, etc. Such pyrazolones have not been used heretofore for the preparation of azodyestuffs.

We have found that the azodyestuffs obtainable from them have far superior fastness properties than those made from known pyrazolones.

They give yellow shades on wool which with respect to the properties of fastness to fulling, perspiration, and level dyeing, as well as unusual fastness to light, are not obtainable with pyrazolone dyestuffs heretofore known. The same is true of their use as lake dyestuffs. In the latter case, one obtains yellow, water-soluble dyestuffs which are fast to lime and water when made up as distemper paints and which show an extraordinary fastness to light. These pyrazolones are also suitable as coupling components in the formation of chrome mordant dyestuffs for wool, especially those which contain an o-hydroxycarboxylic acid residue. With these products, one obtains wool dyestuffs which give very fast greenish yellows and also red tints that are fast to potting.

*Example 1.*—327 parts by weight of 4'-methyl-2-aminodiphenylsulphone-4-sulphonic acid are diazotized and coupled in the presence of sodium acetate with 438 parts by weight of pyrazolone carboxylic acid obtained from 4'-methyl-2-aminodiphenylsulphone-4-sulphonic acid. The dyestuff is salted out, isolated and dried. It probably has the formula:

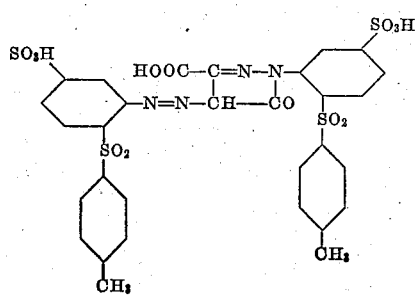

In distemper paints it dyes a greenish yellow. The color is fast to lime and water and very fast to light.

The pyrazolone carboxylic acid is obtained from oxalacetic ester and the hydrazine of 4'-methyl-2-aminodiphenylsulphone-4-sulphonic acid. The reactions involved may be represented as follows:

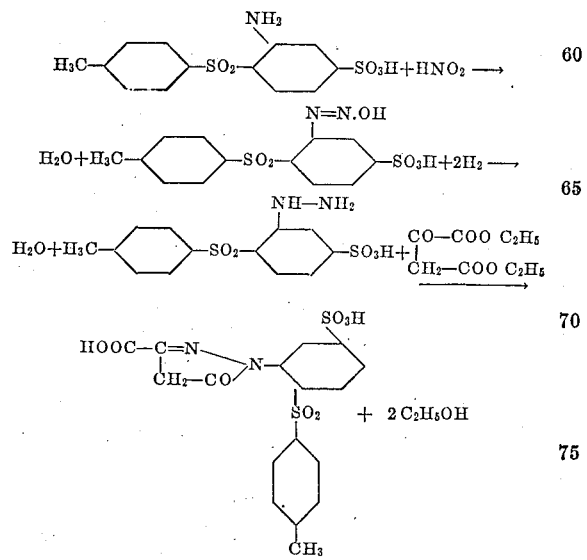

It is a colorless powder which dissolves easily in alkali and aqueous sodium acetate solution. It yields dyestuffs by coupling with diazo compounds.

If 4'-methyl-2-aminodiphenylsulphone obtainable by reduction of the condensation product of 4-toluol-1-sulphonic acid and 2-nitro-1-chlorbenzol, is used in place of the 4'-methyl-2-aminodiphenylsulphone-4-sulphonic acid, a dyestuff of similar characteristics is produced.

The methylpyrazolone obtained from 4'-methyl-2-aminodiphenylsulphone is a colorless crystalline powder melting at 178–180°.

*Example 2.*—327 parts by weight of 4'-methyl-2-aminodiphenylsulphone-4-sulphonic acid are diazotized and coupled in the presence of sodium acetate with 438 parts by weight of the pyrazolone carboxylic acid obtained from 4'-methyl-4-aminodiphenylsulphone-2-sulphonic acid. The dyestuff is salted out and worked up in the usual manner. It probably has the formula:

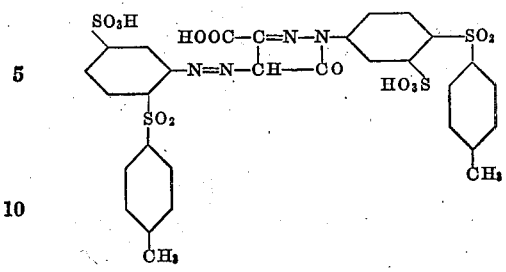

In distemper paints it dyes a greenish yellow. Its characteristics of fastness are about those of the product of Example 1.

The pyrazolone carboxylic acid is obtained by reduction of the condensation product of 4-toluol-1-sulphinic acid and 4-nitro-1-chlorbenzol-2-sulphonic acid, conversion of the amine so obtained by the well-known methods into the hydrazine and conversion of the latter into the pyrazolone carboxylic acid by means of oxalacetic ester. It is a colorless powder which dissolves easily in alkali and aqueous sodium acetate solution and which yields dyestuffs by combining with diazo compounds.

The products made according to this invention are yellow to orange powders which when dissolved in sulphuric acid give solutions of the same colors as their dyeings.

This application is a division of our application Serial No. 79,476, filed January 5, 1926.

We claim:

1. As new products, the azodyestuffs having in the free state most probably the formula:

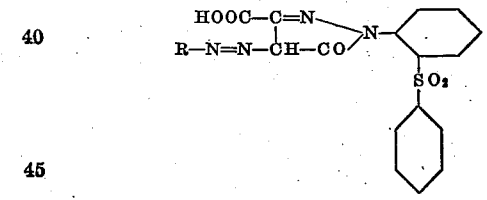

wherein R represents an aromatic group and in which the benzene nuclei attached to the sulphone group may be substituted or not, which dyestuffs are obtainable by coupling a corresponding aromatic diazo compound with a pyrazolone carboxylic acid of an amino-diarylsulphone.

2. As a new product, the azodyestuff having in the free state the formula:

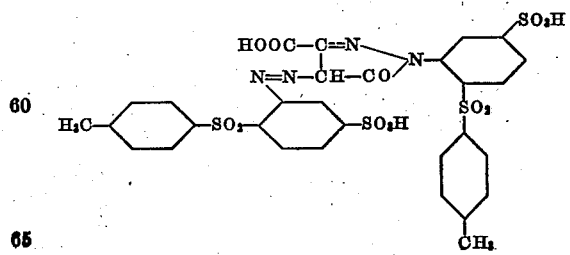

3. As new products, the azodyestuffs having in the free state most probably the formula:

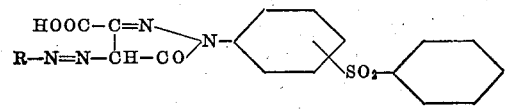

wherein R represents an aromatic group, wherein the

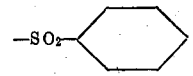

substituent may be in either the 2- or 4-position to the nitrogen, and in which the benzene nuclei attached to the sulfone group may be substituted or not, which dyestuffs are obtainable by coupling a corresponding aromatic diazo compound with a pyrazolone carboxylic acid of an amino-diarylsulfone.

4. As new products, the azodyestuffs having in the free state the formula:

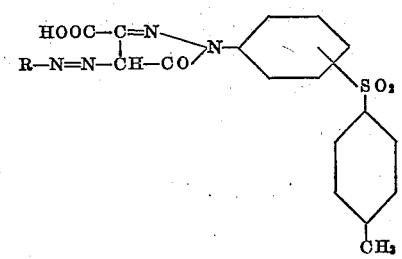

in which R stands for an aromatic group, in which the

substituent may be either the 2- or 4-position to the nitrogen, and in which the benzene nucleus attached to the nitrogen may be further substituted.

5. As new products, the azodyestuffs having in the free state the formula:

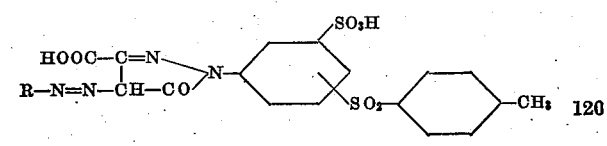

in which R stands for an aromatic group, in which the

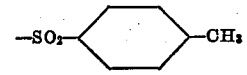

substituent may be in either the 2- or 4-position to the nitrogen.

6. As new products, the azodyestuffs having in the free state the formula:

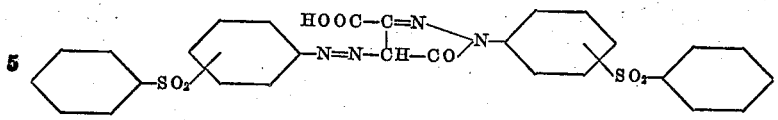

in which each

substituent may be in either the 2- or 4-position to nitrogen and in which the benzene nuclei attached to the sulfone groups may be further substituted.

7. As new products, the azodyestuffs having in the free state the formula:

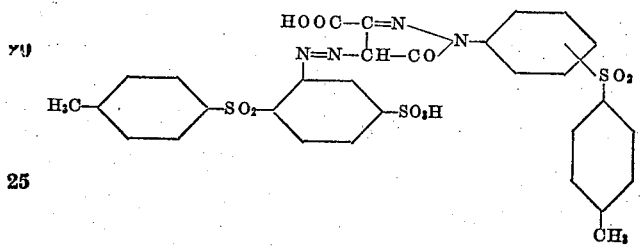

wherein the benzene nucleus attached to the nitrogen on the right may be further substituted and wherein the

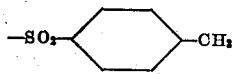

substituent on the right may be in either the 2- or 4-position to the nitrogen.

8. As a new product, the azodyestuff having in the free state the formula:

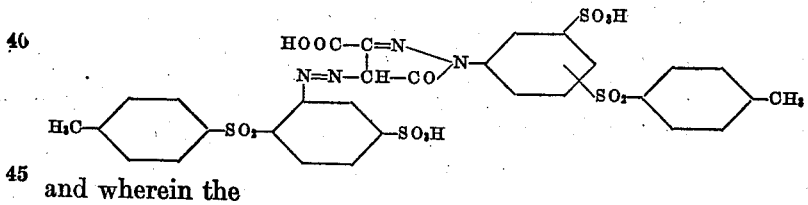

and wherein the

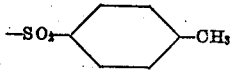

substituent on the right may be in either the 2- or 4-position to the nitrogen.

In testimony whereof, we affix our signatures.

HUGO SCHWEITZER.
WILHELM NEELMEIER.